United States Patent [19]
Phillips

[11] Patent Number: 6,110,545
[45] Date of Patent: *Aug. 29, 2000

[54] VARIABLE DECORATIVE TREATMENT

[76] Inventor: Catherine C. Phillips, 8N106 Citation Ct., St. Charles, Ill. 60175

[*] Notice: This patent is subject to a terminal disclaimer.

[21] Appl. No.: 09/307,280

[22] Filed: May 7, 1999

Related U.S. Application Data

[63] Continuation-in-part of application No. 08/903,228, Jul. 22, 1997, Pat. No. 5,945,180.

[51] Int. Cl.[7] .................................................. A47G 1/12
[52] U.S. Cl. .............................. 428/14; 428/38; 428/542.8
[58] Field of Search ................................... 428/542.8, 38, 428/14; 52/311.1, 204.593

[56] References Cited

U.S. PATENT DOCUMENTS 5,945,180   8/1999   Phillips ......................................... 428/14

Primary Examiner—Deborah Jones
Assistant Examiner—Abraham Bahta
Attorney, Agent, or Firm—Wood, Phillips, VanSanten, Clark & Mortimer

[57] ABSTRACT

A decorative assembly including a frame having first and second spaced apart frame elements between which a display space is defined, a first display element having a first decorative appearance, and a receptacle and projection defined on each of the first and second frame elements and first display element cooperating to removably maintain the first display element in a first predetermined relationship at a first location in the display space. A second display element having a second decorative appearance is also provided, with a receptacle and projection defined on each of the first and second frame elements and second display element cooperating to removably maintain the second display element in a second predetermined relationship at the first location in the display space. The first and second display elements are capable of being selectively interchangeably displayed at the first location to selectively change the overall appearance of the decorative assembly.

42 Claims, 15 Drawing Sheets

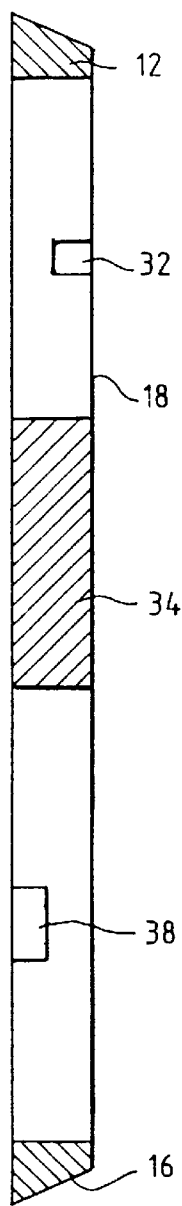
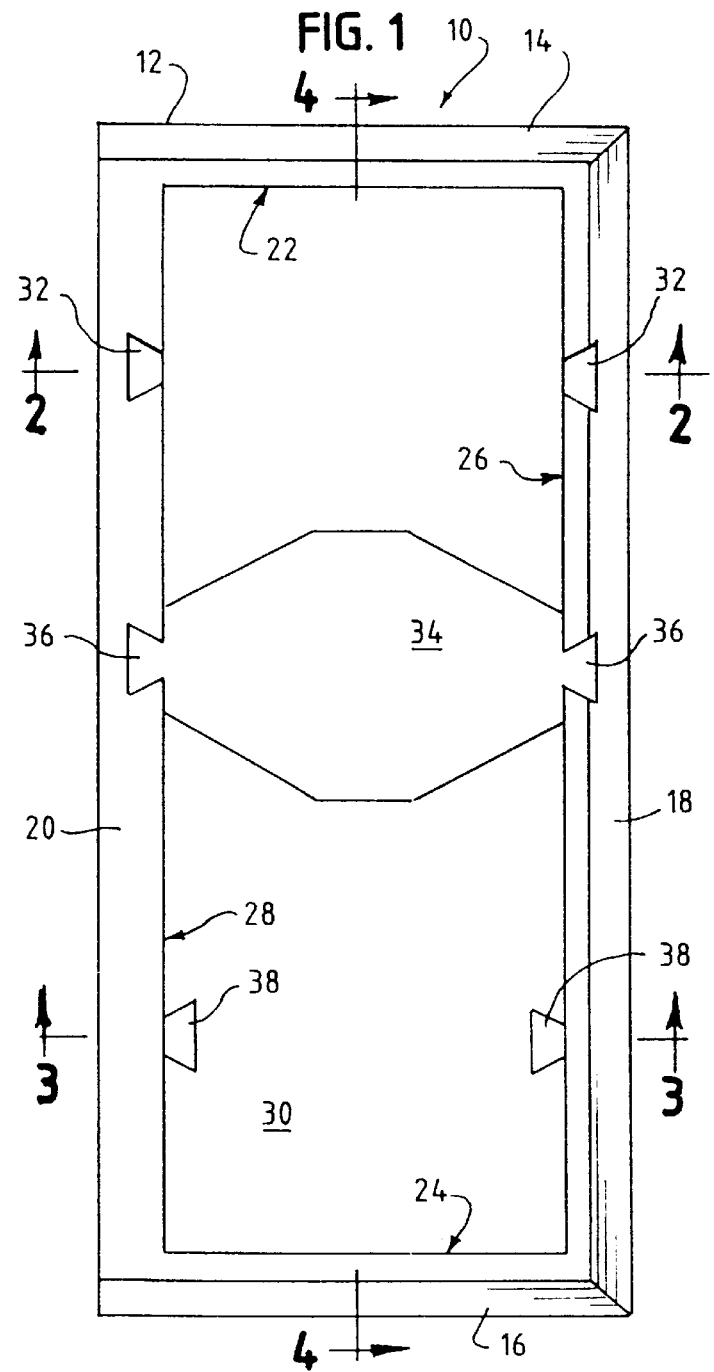
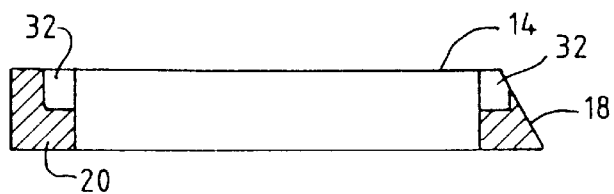
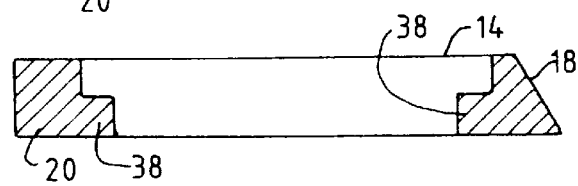
FIG. 4
FIG. 1
FIG. 2
FIG. 3

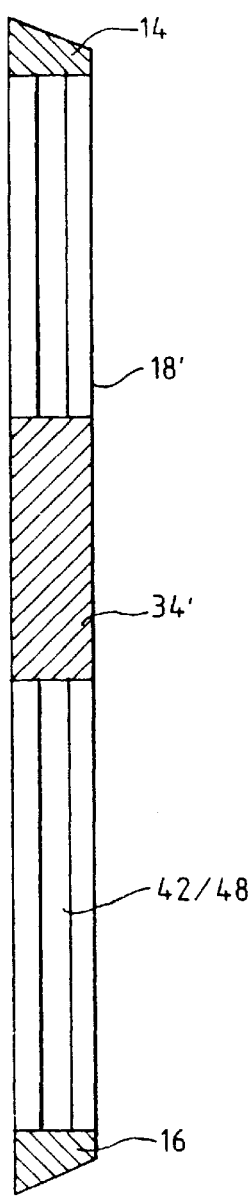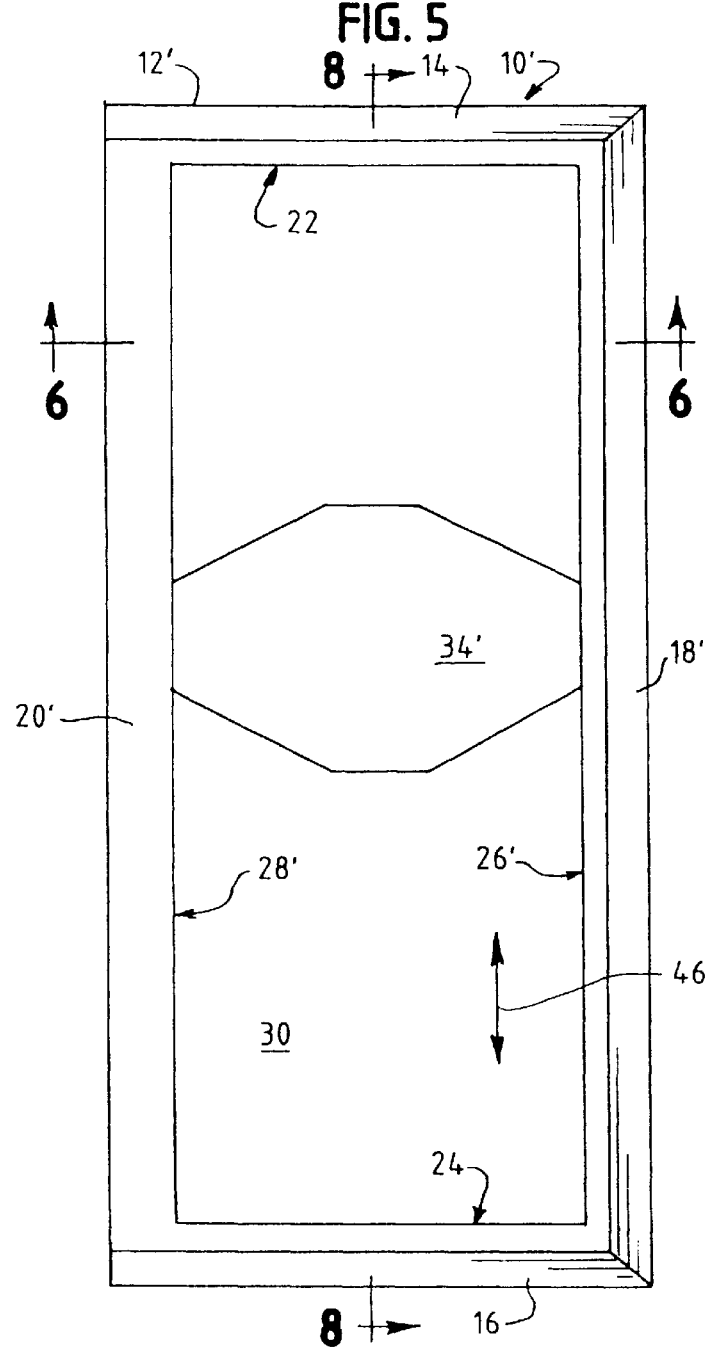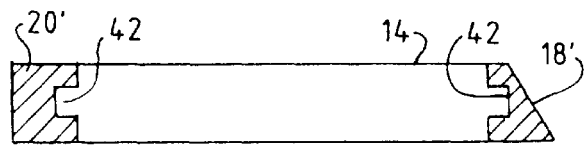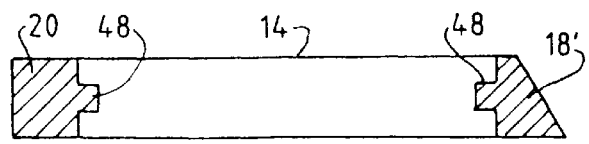

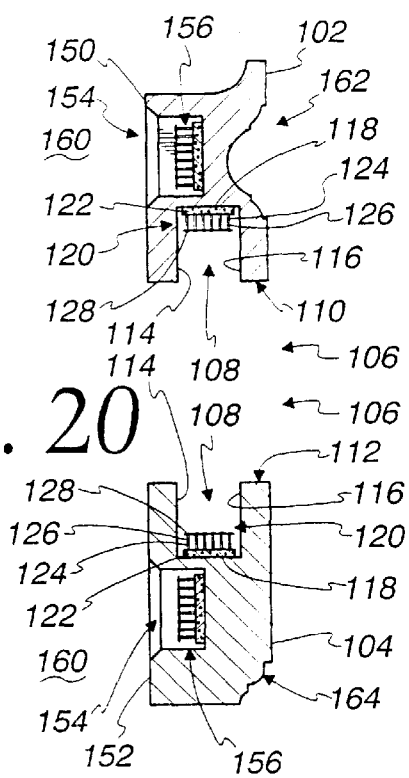
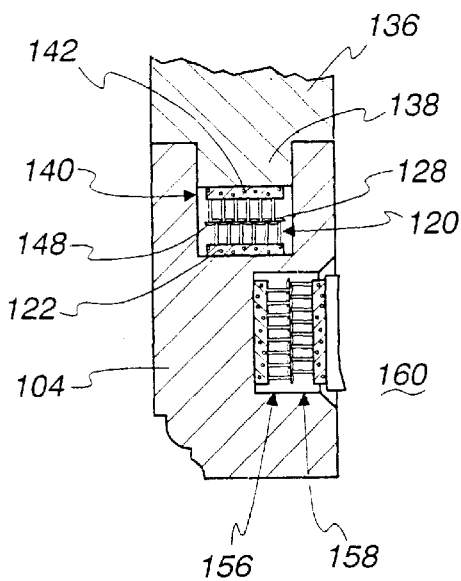
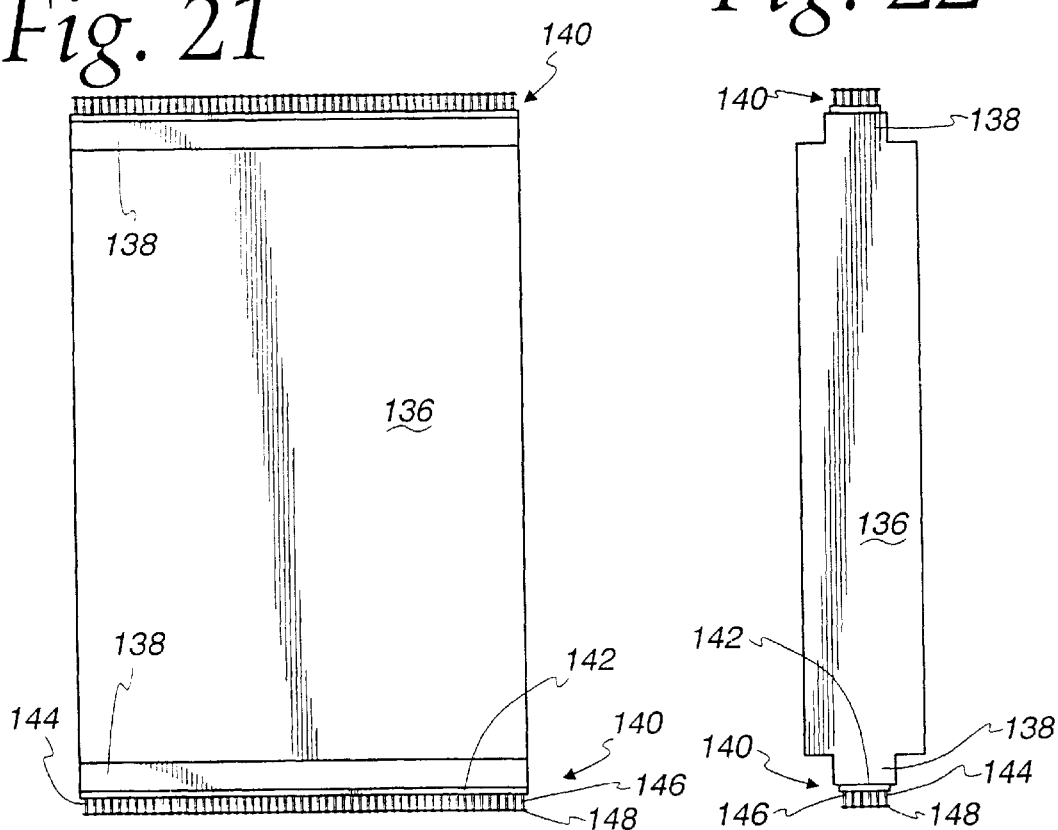

VARIABLE DECORATIVE TREATMENT

CROSS-REFERENCE TO RELATED APPLICATIONS

This application is a continuation-in-part of U.S. application Ser. No. 08/903,228, filed Jul. 22, 1997 now U.S. Pat. No. 5,945,180.

BACKGROUND OF THE INVENTION

1. Technical Field

The present invention is directed to a decorative treatment, as for windows, walls, etc., and, more particularly, to a decorative treatment having interchangeable elements.

2. Background Art

Windows are placed in all types of buildings permitting external light to illuminate a room and also allowing the occupant to view the outside. While windows are generally designed to be primarily functional in nature, many residential building owners, and some commercial building owners, desire their windows to be aesthetically pleasing as well as functional. In a commercial setting, this helps to maintain a pleasant, relaxed working environment, presumably boosting the morale of the employees and increasing the quantity and quality of their work. In a residential setting, aesthetically pleasing windows add a sense of personality and warmth to the home.

Leaded and beveled glass are two examples of materials used to give windows an aesthetically pleasing appearance. Further, grid systems have been developed which are mounted inside a double window pane unit and securely hold decorative art glass panes in place. However, a drawback with the above examples is that they may not permit a home or business owner to readily and easily change the decorative appearance of the window. An owner may wish to change the decorative features of his/her windows in accordance with the holidays or the changing seasons, or simply because he/she feels like it.

The same holds true for interior windows and walls whether in a home or business. Interior windows help to bring in an abundance of natural light into a room. With the shrinking of residential lots and a consumer's desire for privacy, interior windows are becoming more prevalent as a way of bringing natural light into rooms with minimum exterior windows. Walls, both interior and exterior, are generally painted or wall-papered. Changing the decorative appearance (color of paint, wall-paper print, etc.) of a wall is typically not an easy task. Accordingly, an owner may desire to change, or add, decorative features on his/her interior windows and walls, thus changing their decorative appearance to match particular decorating schemes, etc.

SUMMARY OF THE INVENTION

A decorative assembly, i.e., kit, is provided according to the present invention including a frame having first and second spaced apart frame elements between which a display space is defined and visible as viewed from a first vantage point, and a first display element. A receptacle and projection are defined one each on the first and second frame elements and the first display element which cooperate to releasably maintain the first display element in a first predetermined relationship at a first location in the display space. A second display element is also provided, with a receptacle and projection defined one each on the first and second frame elements and the second display element cooperating to releasably maintain the second display element in a second predetermined relationship at the first location in the display space with the first display element absent from the first location. The first and second display elements perform primarily a decorative function and have first and second decorative appearances, respectively, as viewed from the first vantage point. The first and second display elements are capable of being selectively interchangeably displayed at the first location to selectively change the overall decorative appearance of the first and second frame elements as viewed from the first vantage point.

In one form of the present invention, the receptacle and projection defined on the first and second frame elements and the first and second display elements include a dove-tail connection between the first and second frame elements and the first and second display elements.

In another form of the present invention, the first and second frame elements are attached to an inner surface of a window.

In another form of the present invention, the first and second spaced apart frame elements are elongate and have inner surfaces facing one another and defining the display space, with each inner surface having a channel extending lengthwise along the respective frame element. The first and second display elements each have a pair of flanges removably receivable one each in the channels for guided sliding translatory movement of the first and second display elements in the display space relative to the first and second frame elements.

In another form of the present invention, the channels extending lengthwise along the respective frame elements have a female dove-tailed configuration, and the pairs of flanges on the first and second display elements have a male dove-tail connection that is complementary to the female dove-tail configuration.

In another form of the present invention, the first and second spaced apart frame elements include a plurality of receptacles/projections defined thereon at predetermined locations along their respective lengths. The first and second display elements each have a pair of projections/receptacles, whereby the first and second display elements can be selectively interchangeably displayed at any of the predetermined locations to change the overall decorative appearance of the first and second frame elements as viewed from the first vantage point.

In yet another form of the present invention, the first and second display elements are snap-fit to the frame.

In still another form of the present invention, the first and second display elements are non-transparent and have different decorative appearances.

In an alternative embodiment of the present invention, a decorative assembly is provided having a frame having first and second spaced apart frame elements between which a display space is defined and visible as viewed from a first vantage point. The first and second frame elements are elongate and have inner surfaces facing one another defining the display space, with each inner surface having a channel formed therein extending lengthwise along the respective frame element. A first locking element is disposed in each of the channels and extends along the length of the respective channel. A first display element is provided having a pair of projections defined thereon, with each of the pair of projections including a second locking element. The pair of projections and second locking element on the first display element cooperate with the channels and first locking element in the first and second frame elements to selectively releasably maintain the first display element in the display space at any of a plurality of locations along the length of the first and second frame elements. A second display element is also provided having a pair of projections defined thereon, with each of the pair of projections including the second locking element. The pair of projections and second locking element on the second display element cooperate with the channel and first locking element in the first and second frame elements to selectively releasably maintain the second display element in the display space at any of a plurality of locations along the length of the first and second frame elements.

In one form of the second embodiment of the present invention, each of the channels formed in the first and second frame elements includes opposing retaining surfaces and a bottom surface therebetween, the opposing retaining and bottom surfaces defining a receptacle for receiving the projections on the first and second display elements. The first locking element is disposed on the bottom surface of each of the channels.

In another form of the second embodiment of the present invention, each of the channels formed in the first and second frame elements includes a retaining surface and a bottom surface, the retaining and bottom surfaces defining a receptacle for receiving the projections on the first and second display elements. The first locking element is disposed on the bottom surface of each of the channels.

In yet another form of the second embodiment of the present invention, the first and second locking elements each include a plurality of mushroom-shaped members each having a shaft and an enlarged head. The enlarged heads on the first and second locking elements cooperate to releasably maintain the first and second display elements in the display space at any of the plurality of locations along the length of the first and second frame elements.

It is an object of the present invention to provide a decorative assembly with readily interchangeable decorative features.

It is a further object of the present invention to provide a decorative assembly providing a home or business owner with a variety of custom decorating options.

It is a further object of the present invention to provide an easy to install decorative assembly.

Other aspects, objects and advantages of the present invention can be obtained from a study of the application, the drawings, and the appended claims.

BRIEF DESCRIPTION OF THE DRAWINGS

FIG. 1 is a front elevation view of a first embodiment of the decorative assembly of the present invention, including a frame and an exemplary display element;

FIG. 2 is a cross-sectional view taken along line 2—2 in FIG. 1;

FIG. 3 is a cross-sectional view taken along line 3—3 in FIG. 1;

FIG. 4 is a cross-sectional view taken along line 4—4 in FIG. 1;

FIG. 5 is a front elevation view of a second embodiment of the decorative assembly of the present invention, including a frame and an exemplary display element;

FIG. 6 is a cross-sectional view taken along line 6—6 in FIG. 5;

FIG. 7 is a cross-sectional view similar to that shown in FIG. 6, but including a modification to the frame;

FIG. 8 is a cross-sectional view taken along line 8—8 in FIG. 5;

FIG. 19 is a cross-sectional view of the top frame element taken along line 19—19 in FIG. 18;

FIG. 20 is a cross-sectional view of the bottom frame element taken along line 20—20 in FIG. 18;

FIG. 21 is a front elevation view of a fifth embodiment of the display element;

FIG. 22 is a side elevation view of the display element shown in FIG. 21;

FIG. 23 is a cross-sectional view taken along line 23—23 in FIG. 18, illustrating the interlocking connection between the display and bottom frame elements, and also between the bottom frame element and a surface to which it is attached;

DETAILED DESCRIPTION OF THE PREFERRED EMBODIMENTS

Figure 9:
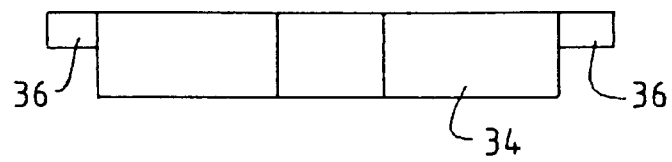
FIG. 9 is a side elevation view of a first embodiment of the display element.

With reference to FIGS. 1–4, one form of the decorative assembly, or kit, according to the present invention, is shown generally at 10. The assembly 10 includes a frame 12 defined by elongate side elements 14,16,18,20. The frame elements 14,16,18,20 are joined at their ends, with the elements 14 and 16 spaced and parallel to one another and the elements 18 and 20 spaced and parallel to one another, to define generally a rectangular configuration. However, it should be understood that other geometric configurations of the frame 12 are also contemplated. The frame elements 14,16,18, 20 include inner surfaces 22,24,26,28, respectively, which define a display space 30. A plurality of dove-tail shaped receptacles 32 are formed in the frame elements 18 and 22 at predetermined locations along their lengths. A display element 34 (see FIG. 9), performing primarily a decorative function and having a first decorative appearance as viewed from a first vantage point, is disposed in the display space 30 and includes spaced dove-tail shaped projections 36 complementary to and receivable one each in the receptacles 32 formed in the frame elements 18 and 20. By directing the projections into the receptacles 32 at selected locations along the length of the frame element 18,20, the display element 34 may be press-fit into a predetermined relationship with the frame 12 at any of the plurality of predetermined locations established by the positions of receptacles 32, thus changing the overall decorative appearance of the assembly 10 as viewed from the first vantage point.

Figure 10:
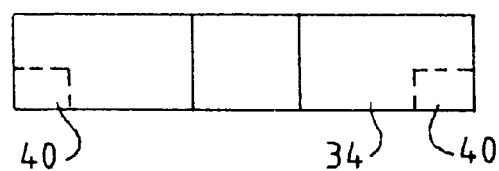
FIG. 10 is a side elevation view of a second embodiment of the display element.

Alternatively, the receptacles 32 may be replaced with dove-tail shaped projections 38 projecting from the inner surfaces 26,28 of frame elements 18,20. Of course, if the frame elements 18,20 include projections 38, the display element 34 (see FIG. 10) would need to be modified to include dove-tail shaped receptacles 40 replacing the projections 36. As before, the display element 34 would simply be press-fit to the frame 12 and held in place by the cooperating projections 38 and receptacles 40 on the frame elements 18,20 and display element 34. While the receptacles 32,40 and projections 38,36 have been described as having a dove-tail configuration, other geometric configurations for the receptacles and projections may be utilized without departing from the spirit and scope of the present invention.

While the display element 34 is depicted as having a non-transparent, geometric configuration, it should be understood, and will become more readily apparent, that other design configurations for the display element 34 are also contemplated Moreover, it should be understood, and will become more readily apparent, that the decorative assembly 10 of the present invention is designed to be utilized with a plurality of display elements 34, which may be selectively interchangeably mounted at any of the predetermined locations as determined by the receptacles 32/projections 38 on the frame 12. The display elements 34 may have the same or different decorative appearance.

Figure 11:
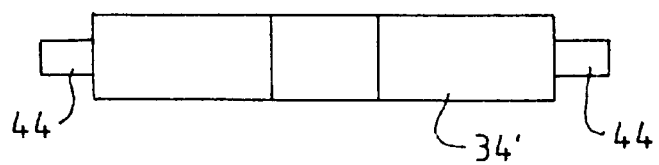
FIG. 11 is a side elevation view a third embodiment of the display element.

Referring now to FIGS. 5–8, a second embodiment of the decorative assembly 10' of the present invention is shown, with like elements having the same reference number and elements which correspond but have been slightly modified indicated with a prime ('). Frame elements 18' and 20' have been modified to include channels 42 formed on their inside surfaces 26' and 28', respectively, with the channels 42 extending generally the entire length of the frame elements 18',20'. The display element 34' has been modified (see FIG. 11) to include projections 44 extending peripherally therefrom. Preferably, the display element 34' is made of a resilient material and is snap-fit to the frame 12' in the display space 30. The projections 44 on the decorative element 34' are received in channels 42 on the frame elements 18',20' and maintain the decorative element 34' within the frame 12' in a predetermined relationship while allowing guided sliding translatory movement of the decorative element 34' in the directions of arrow 46 relative to the frame 12'.

Figure 12:
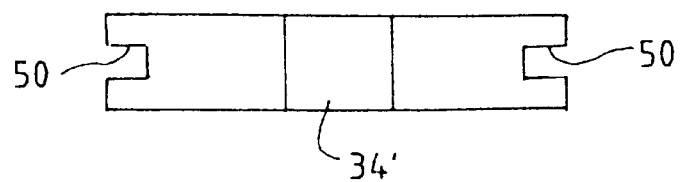
FIG. 12 is a side elevation view of a fourth embodiment of the display element.

Alternatively, as shown in FIG. 7, a raised rib 48 may be formed on the inner surfaces 26',28' of the frame elements 18',20', replacing the channels 42. In this embodiment, the decorative element 34' (see FIG. 12) would include slots 50 replacing the projections 44. Assembly and movement of the decorative element 34' would be accomplished in the same manner as before.

Figure 13:
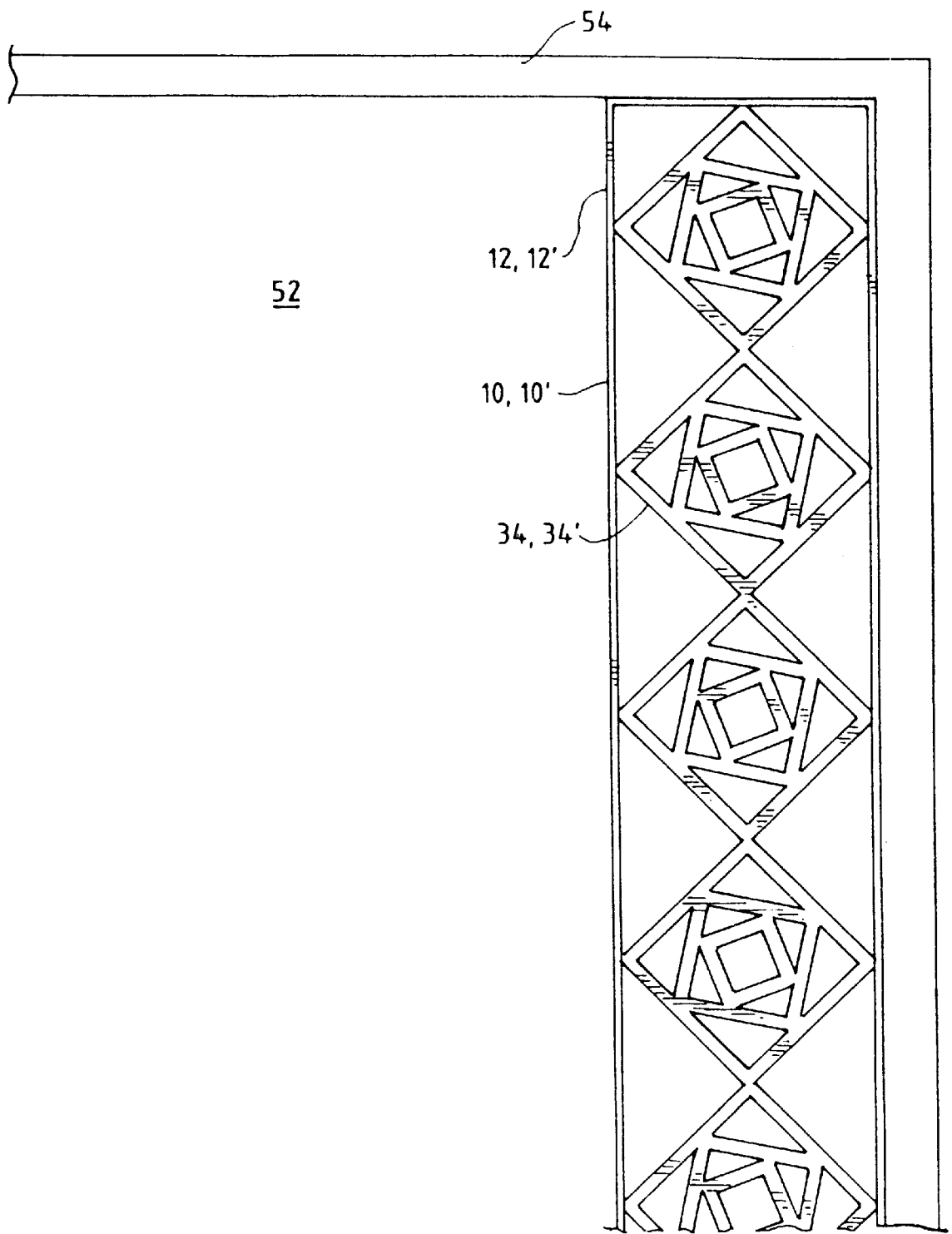
FIG. 13 is a fragmentary front elevation view of the decorative window assembly attached to a window frame, depicting an exemplary decorative design consideration.
Figure 14:
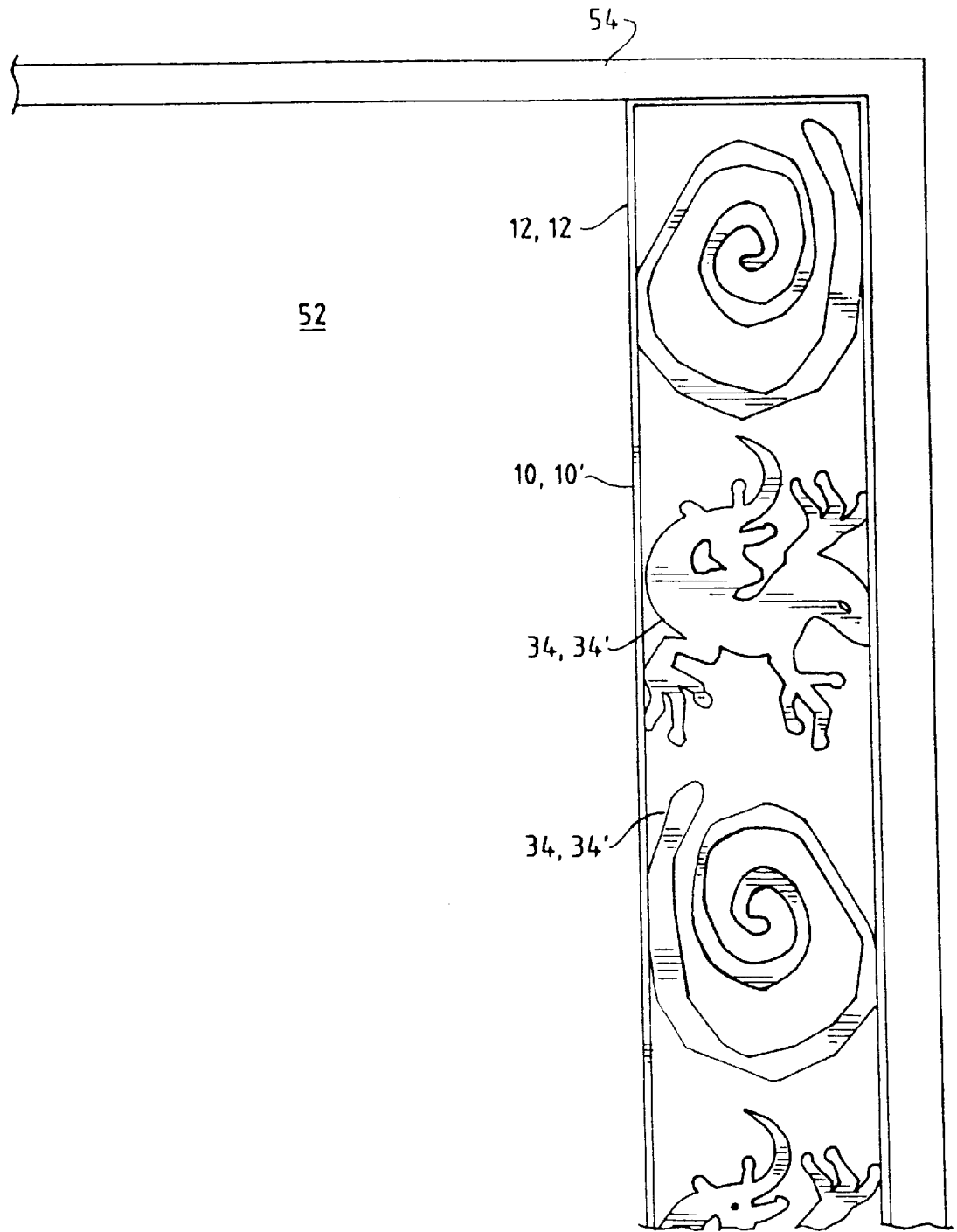
FIG. 14 is a fragmentary front elevation view of the decorative window assembly attached to a window frame, depicting an alternative decorative design consideration.

FIGS. 13–14 depict two (2) of the virtually infinite design configurations for the decorative assembly 10,10' of the present invention. For instance, FIG. 13 depicts the decorative assembly 10,10' attached to an interior surface of a window shown generally at 52. The assembly 10,10' is attached along the edge of the window 52 near the frame 54, and may be attached via any conventional mounting means. It should be understood, however, that the decorative assembly 10,10' may be attached to a wall, door, or any other surface where the decorative assembly 10,10' is desired to be displayed.

The design configuration shown in FIG. 13 depicts a plurality of similarly configured decorative geometric shapes used as the decorative elements 34,34'. Whereas in FIG. 14, alternating decorative design configurations are utilized for the decorative elements 34,34'. It should be noted that the design configurations depicted in FIGS. 13 and 14 can be utilized with either embodiment of the decorative assembly 10,10'. That is, the display elements 34,34' may be attached to the frame 12,12' via cooperating projections and receptacles whereby the display elements 34 would be releasably held in fixed predetermined locations along the frame 12, or alternatively, the display elements 34' may be mounted to the frame via cooperating channels and ribs, whereby the guided sliding translatory movement of the decorative elements 34' with respect to the frame 12' could be effectuated. The decorative elements 34,34' may be made out of either transparent or non-transparent material.

Figure 15:
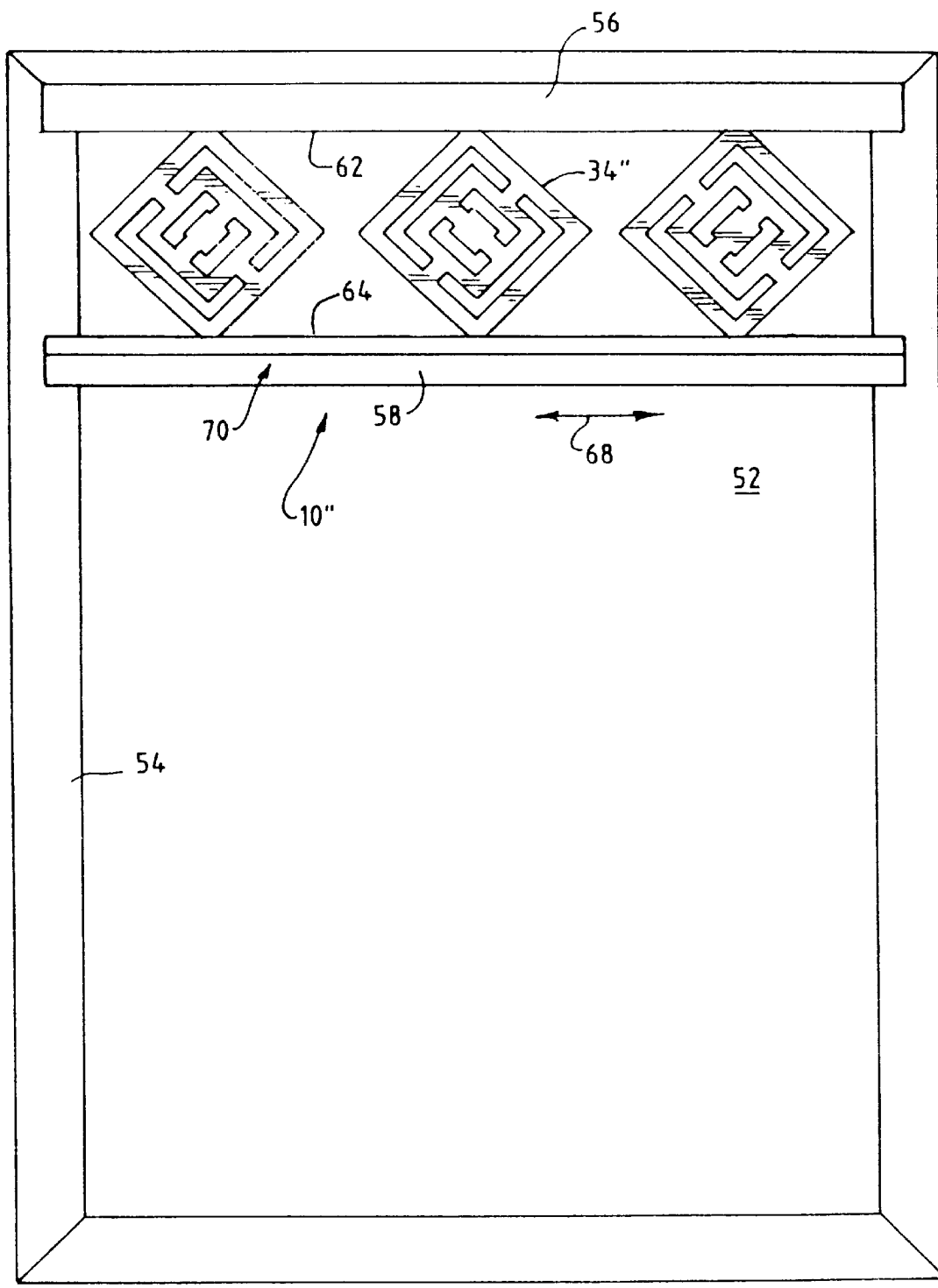
FIG. 15 is a front elevation view of a third embodiment of the decorative assembly of the present invention, including a sash, a frame and exemplary display elements.
Figure 16:
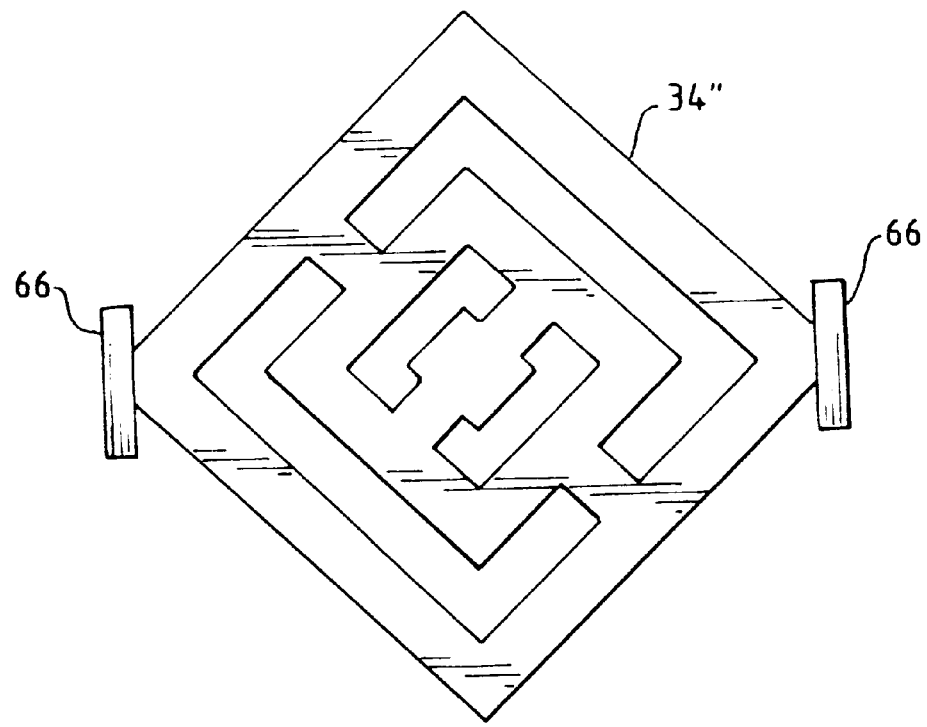
FIG. 16 is an enlarged, front elevation view of the exemplary display element depicted in FIG. 15.
Figure 17:
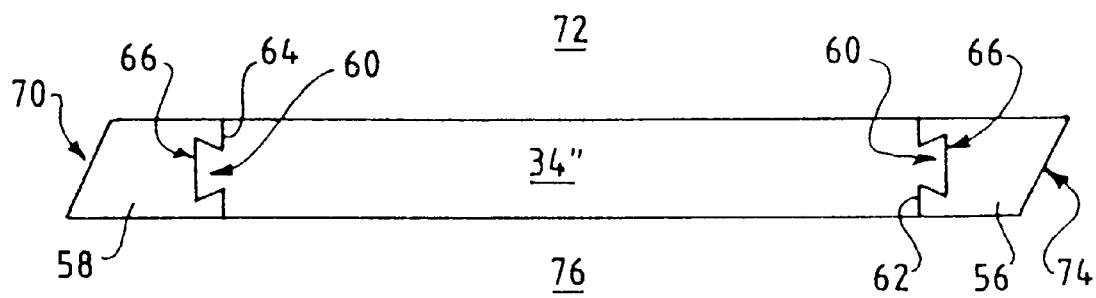
FIG. 17 is an enlarged, side elevation view of the third embodiment of the decorative assembly of the present invention.

Referring now to FIGS. 15–17, a third embodiment of the decorative assembly 10" of the present invention is shown, with like elements having the same reference number and elements which correspond but have been slightly modified indicated with a double prime ("). The decorative assembly 10" includes top 56 and bottom 58 frame elements which are attached to the frame 54 of window 52. Again, however, the top 56 and bottom 58 frame elements may be attached to a wall, door, or any other surface where the decorative assembly 10" is desired to be displayed. The top 56 and bottom 58 frame elements include dove-tail shaped channels 60 formed on their inside surfaces 62 and 64, respectively, with the channels 60 extending generally the entire length of the frame elements 56,58. The display element 34" includes dove-tail shaped projections 66 extending from opposite sides thereof. The dove-tail connection between the projections 66 on the display element 34" and each of the channels 60 in the top 56 and bottom 58 frame elements, maintains the decorative element 34" in a predetermined relationship while allowing guided sliding translatory movement of the decorative element 34" in the directions of the arrow 68 relative to the top 56 and bottom 58 frame elements. The dove-tail configuration is for illustrative purposes only, and other geometric configurations for the projections 66 and channels 60 may be utilized without departing from the spirit and scope of the present invention.

The bottom frame element 58 includes a bevel 70 formed on the side, shown generally at 72, viewable from the interior of the window, while the top frame element 56 includes a bevel 74 on the side, shown generally at 76, which abuts the window sash 52 and frame 54. It should be noted that both the top 56 and bottom 58 frame elements may also be squared or shaped or designed to match a window manufacturer's specifications for their optional grilles. Further, both the top 56 and bottom 58 frame elements may be beveled to match a window manufacturer's specifications on a window sash where the styles and rails bevel toward the glass. This will assure a proper fit for the decorative assembly 10" to set into the frame 54 and appear to be a part of the window sash 52.

Referring now to FIGS. 18–23, a fourth embodiment, shown generally at 100, of the decorative assembly of the present invention is shown. The decorative assembly 100 includes top 102 and bottom 104 spaced apart frame elements defining a display space 106 therebetween, the display space 106 being generally visible as viewed from a first vantage point. The top 102 and bottom 104 frame elements are elongate and include channels 108 formed on their inside surfaces 110 and 112, respectively, with the channels 108 extending generally the entire length of the frame elements 102, 104. The frame elements 102 and 104 may be cut to any desired length to suit a customer's particular needs.

The channels 108 formed in the top 102 and bottom 104 frame elements include opposing side, or retaining, surfaces 114 and 116, and a bottom surface 118 therebetween. A first locking element, shown generally at 120, is provided in the channel 108 on the bottom surface 118. The first locking element 120 includes a base 122 having a plurality of mushroom-shaped members 124 extending therefrom. The mushroom-shaped members 124 each include a shaft 126 having an enlarged head 128 on an end thereof.

Figure 18:
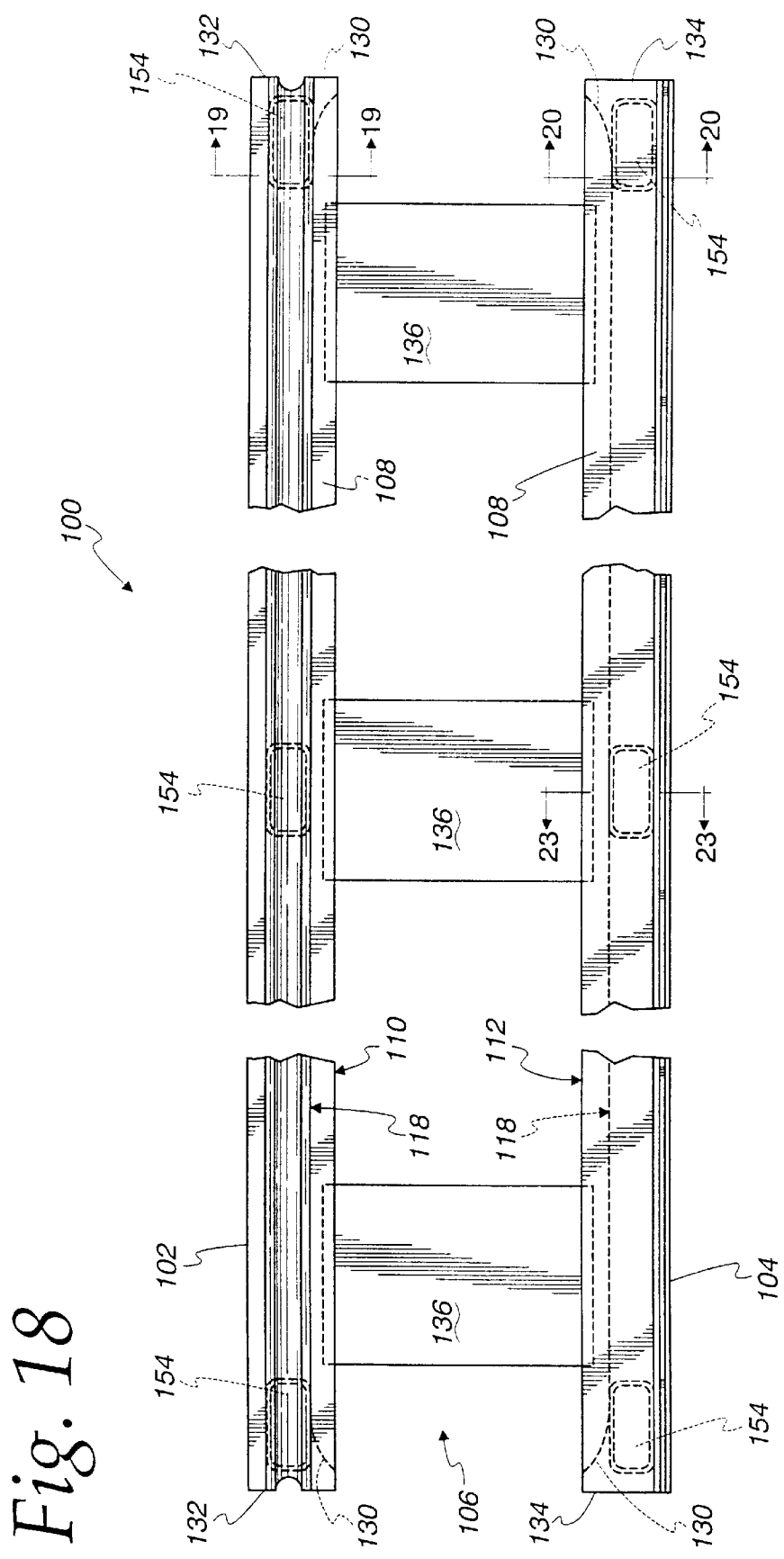
FIG. 18 is a front elevation view of a fourth embodiment of the decorative assembly of the present invention, including spaced apart frame elements and exemplary display elements.
Figure 24:
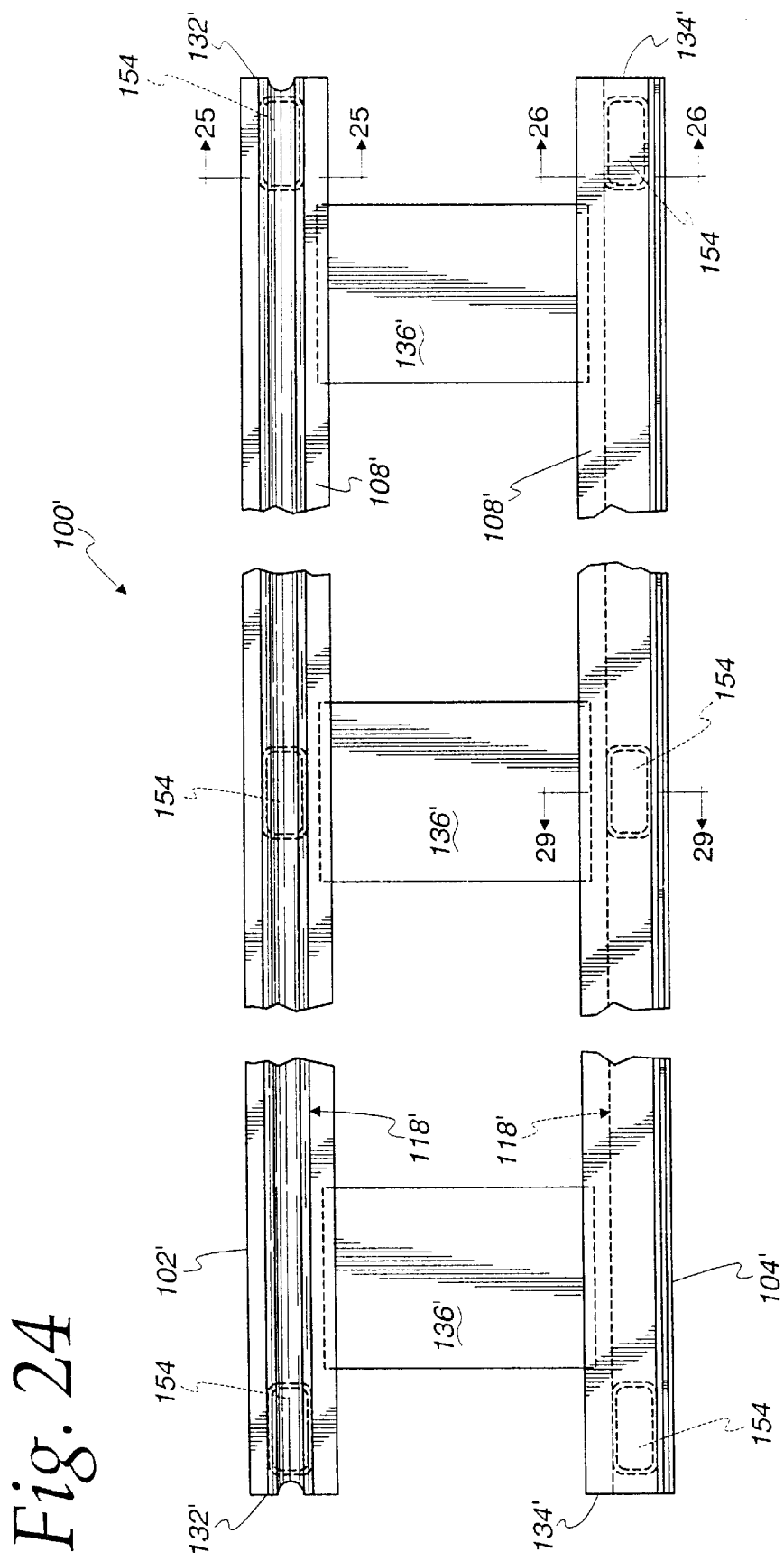
FIG. 24 is a front elevation view of a fifth embodiment of the decorative assembly of the present invention, including spaced apart frame elements and exemplary display elements.
Figure 25:
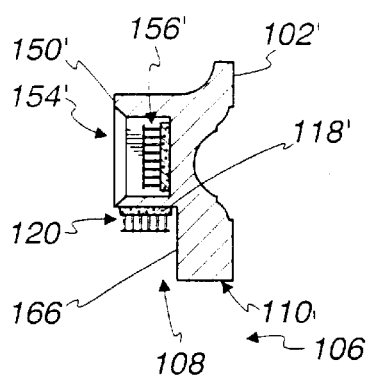
FIG. 25 is a cross-sectional view of the top frame element taken along line 25—25 in FIG. 24.
Figure 26:
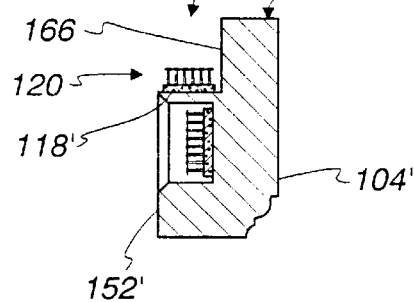
FIG. 26 is a cross-sectional view of the bottom frame element taken along line 26—26 in FIG. 24.
Figure 27:
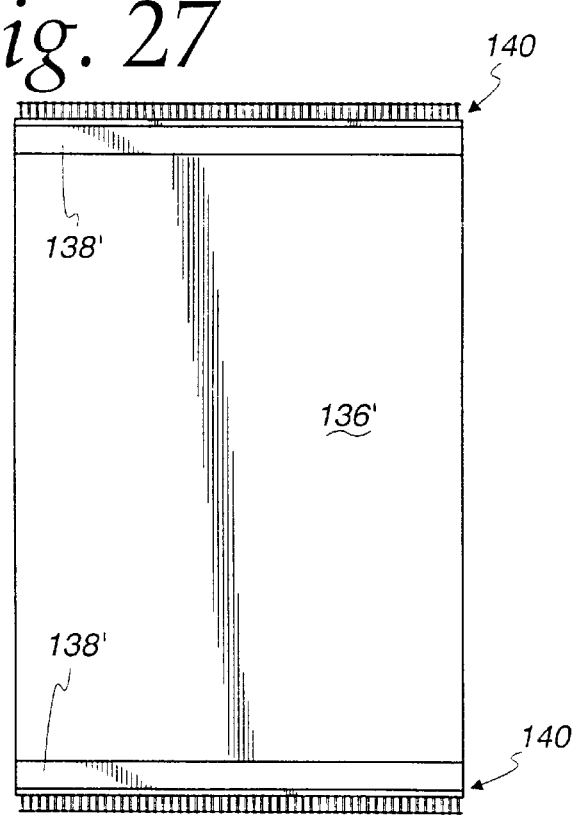
FIG. 27 is a front elevation view of a sixth embodiment of the display element.

As shown in FIG. 18, preferably the channels 108 do not extend the entire lengths of the top 102 and bottom 104 frame elements, but rather taper at end portions 130 to aid in preventing the ends 132 and 134 of the top 102 and bottom 104 frame elements, respectively, from breaking or chipping.

Referring to FIGS. 18 and 21–22, display elements 136 are releasably maintained in the display space 106 between the top 102 and bottom 104 frame elements. Each display element 136 includes projections 138 extending from opposite sides thereof. The projections 138 include a second locking element, shown generally at 140, provided thereon. The second locking element 140 includes a base 142 attached to the projection 138, and a plurality of mushroom-shaped members 144 extending therefrom. The mushroom-shaped members 144 each include a shaft 146 having an enlarged head 148 at an end thereof. The display elements 136 may have any decorative appearance.

As shown in FIG. 23, the projections 138 on the display element 136 are received in the channels 108, defined by the retaining 114 and bottom 116 surfaces, formed in the top 102 and bottom 104 frame elements. While FIG. 23 only shows the display element 136 secured to the bottom frame element 104, the display element 136 is secured to the top frame element 102 in the same manner. As the projection 138 is pushed into the channel 108, the enlarged heads 148 on the second locking element 140 engage and move past the enlarged heads 128 on the first locking element 120. The enlarged heads 148 on the second locking element 140 cooperate with the enlarged heads 128 on the first locking element 120, and the projections 138 on the display element 136 cooperate with the channels 108 in the top 102 and bottom 104 frame elements, both to selectively releasably secure the display elements 136 in the display space 106 between the top 102 and bottom 104 frame elements. The display elements 136 are thus capable of being selectively interchangeably displayed at any of a plurality of locations along the lengths of the top 102 and bottom 104 frame elements to change the overall decorative appearance of the decorative assembly 100 as viewed from the first vantage point.

Preferably, the first 120 and second 140 locking elements are a dual lock product manufactured and sold by 3M. Each of the bases 122 and 142 of the first 120 and second 140 locking elements include an adhesive that secures the respective locking element 120 and 140 to its desired surface. It should be understood, however, that the first 120 and second 140 locking elements are not limited to the 3M dual lock product and may include a myriad of fastening devices, such as, but not limited to, Velcro, double back adhesive tape, etc.

As shown in FIGS. 18–20 and 23, the interior surfaces 150 and 152 of the top 102 and bottom 104 frame elements include cutout portions 154 at spaced intervals along the lengths thereof. The cutout portions 154 are designed to accept a locking element 156 along the lines as previously described with respect to the first 120 and second 140 locking elements. The locking element 156 engages a similar-type locking element 158 which is adhered to a surface 160 on which the decorative assembly 100 is to be affixed. The surface 160 may include, for illustrative purposes only, a window, wall, mirror, cabinet trim, door, etc. Generally, to assure secure attachment to the surface 160, for each three feet of length of the top 102 and bottom 104 frame elements, an additional equally spaced cutout 154 should be added to accept the locking element 156. It should be noted, however, that virtually any method of attaching the top 102 and bottom 104 frame elements to the surface 160 may be utilized without departing from the spirit and scope of the present invention.

The top frame element 102 includes a groove 162 formed on the side designed for viewing by an observer, and the second frame element 104 includes a bevel 164 generally on the same viewing side. This is generally for aesthetic, or decorative, purposes, and other shapes or designs of the top 102 and bottom 104 frame elements may be utilized depending upon the specific application of the decorative assembly 100. Further, the sides 132 and 134 of the top 102 and bottom 104 frame elements may be squared, or shaped, or designed per application.

Referring now to FIGS. 24–29, a fifth embodiment of the decorative assembly 100' of the present invention is shown, with like elements corresponding to FIGS. 18–23 having the same reference number, and elements which correspond but have been slightly modified indicated with a prime ('). The top 102' and bottom 104' frame elements have been modified such that the channels 108' formed on their inside surfaces 110' and 112', respectively, extend all the way to their respective inner surfaces 150' and 152'. The channels 108' include a retaining surface 166 and a bottom surface 118'. The first locking element 120 is affixed to the bottom surface 118' of the top 102' and bottom 104' frame elements as previously described. While the channels 108' are shown extending all the way to the ends 132' and 134' of the top 102' and bottom 104' frame elements, respectively, the channels 108' may be squared off at the ends 132' and 134' or may taper similar to the channel 108 shown in FIG. 18. Further, the geometric configurations of the channels 108, 108' are for exemplary purposes only, and other geometric configurations may be utilized without departing from the spirit and scope of the present invention.

The display element 136' includes projections 138' extending from opposite sides thereof. The projections 138' are configured to be received in the channel 108' when the display element 136' is releasably maintained and the display space 106 between the top 102' and bottom 104' frame elements. The second locking element 140 is affixed to the projections 138' in a manner as previously described.

Figure 29:
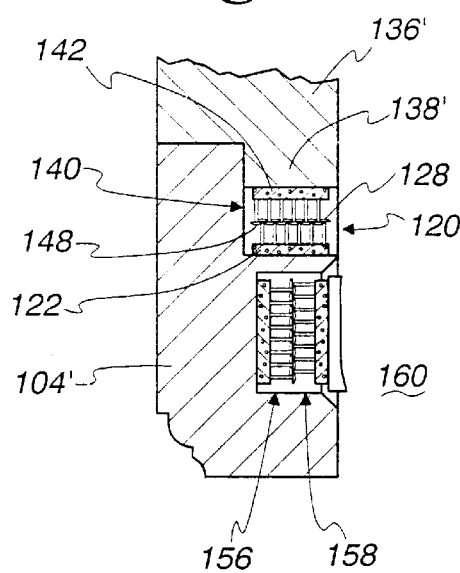
FIG. 29 is a cross-sectional view taken along 29—29 in FIG. 24, illustrating the interlocking connection between the display and bottom frame elements, and also between the bottom frame element and a surface to which it is attached.
Figure 28:
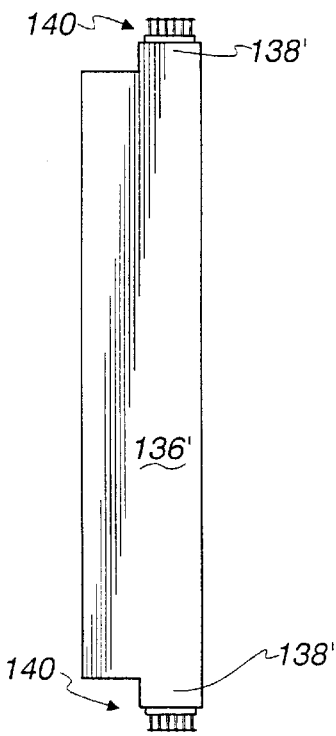
FIG. 28 is a side elevation view of the display element shown in FIG. 27.

The top 102' and bottom 104' frame elements are attached to the surface 160 via locking elements 156 and 158 as previously described. The first 120 and second 140 locking elements, as shown in FIG. 29, cooperate in the same manner as previously described to releasably maintain the display element 136' in the display space 106 between the top 102' and bottom 104' frame elements. In this particular embodiment, the surface 160 on which the decorative assembly 100' is attached, is utilized to aid in supporting the display elements 136' within the display space 106 between the top 102' and bottom 104' frame elements. Again, the top 102' and bottom 104' frame elements may be of any desired length suitable to a consumer's particular needs.

While the top 102,102' and bottom 104,104' frame elements have been described as each including a channel 108,108', it should be understood that the channel 108,108' may be formed in only one of the top 102,102' or bottom 104,104' frame elements. In this form, the display element 136,136' need only have a projection 138,138' cooperating with the frame element in which the channel 108,108' is formed. The frame element without the channel would simply rest flush against the display elements 136,136' providing a finishing decorative touch to the decorative assembly 100,100'.

Further, the decorative assembly 100,100' may, in certain applications, require only one of the top 102,102' and bottom 104,104' frame elements. Still further, various other configurations for releasably maintaining the display elements to the top 102,102' and/or bottom 104,104' frame elements within the display space 106 may be implemented without departing from the spirit and scope of the present invention. FIGS. 30–34 illustrate exemplary securing configurations.

Figure 30:
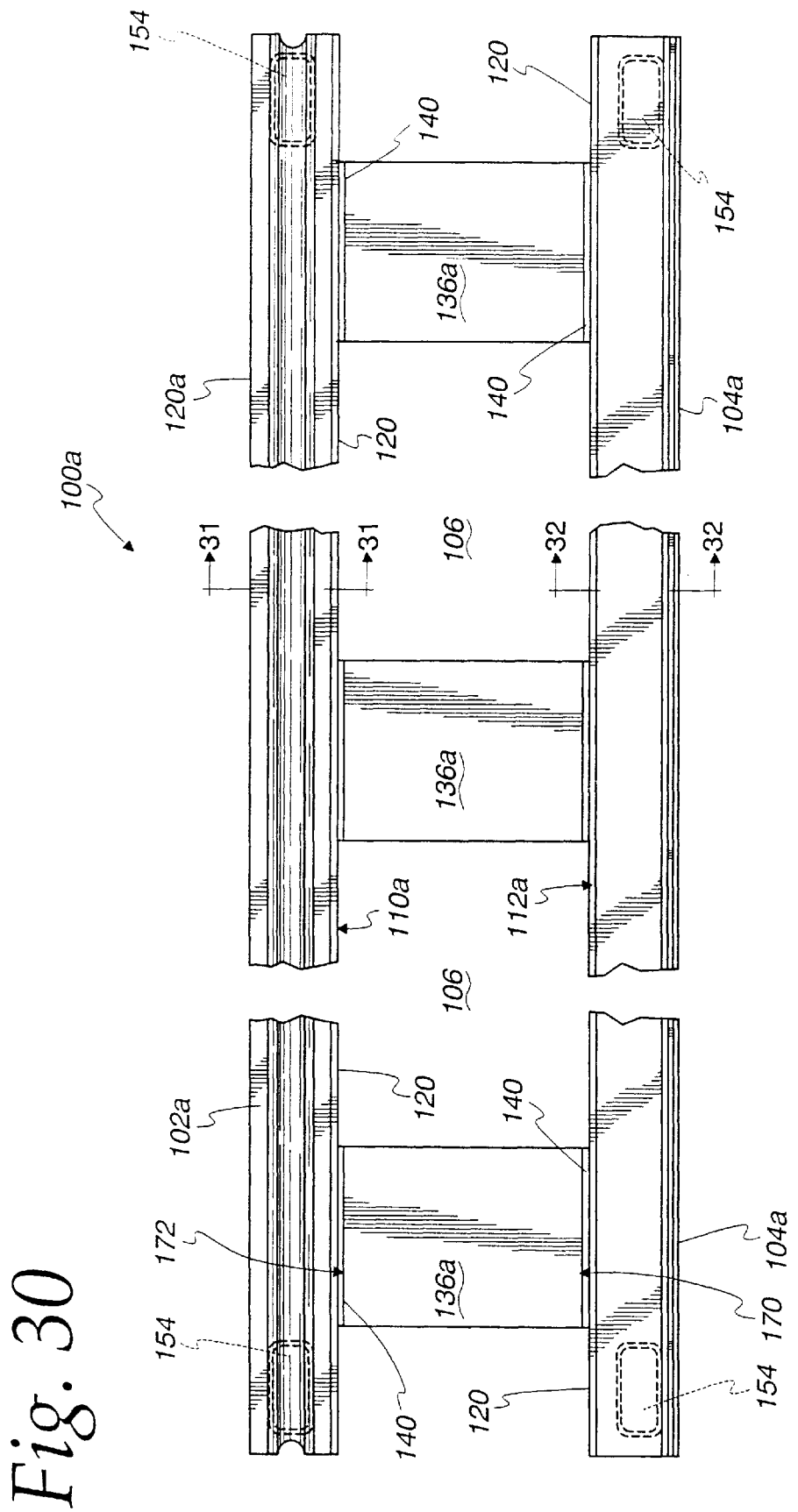
FIG. 30 is a front elevation view of a sixth embodiment of the decorative assembly of the present invention, including spaced apart frame elements and exemplary display elements.
Figure 31:
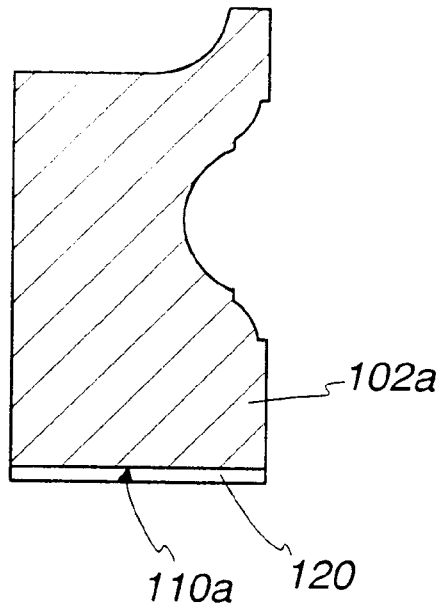
FIG. 31 is a cross-sectional view of the top frame element taken along line 31—31 in FIG. 30.
Figure 32:
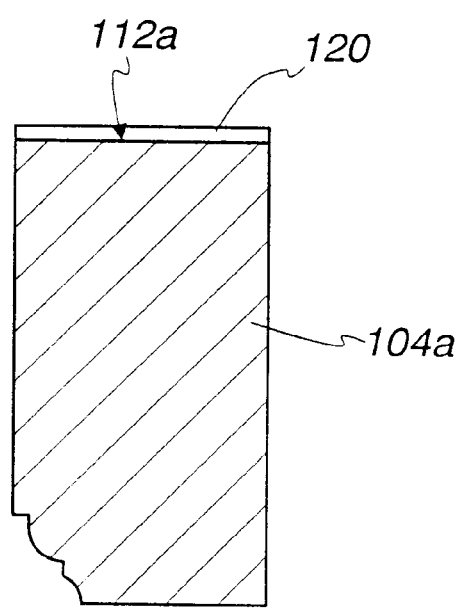
FIG. 32 is a cross-sectional view of the bottom frame element taken along line 32—32 in FIG. 30.

As shown in FIGS. 30–32, the top 102a and bottom 104a frame elements each include substantially flat inner surfaces 110a and 112a, respectively. The first locking element 120 is disposed on the inner surfaces 110a and 112a of the top 102a and bottom 104a frame elements, and extends substantially the entire length of the top 102a and bottom 104a frame elements. The display elements 136a include the second locking element 140 disposed on opposing surfaces 170,172 thereof. The first 120 and second 140 locking elements cooperate to selectively releasably secure the display elements 136a in the display space 106 between the top 102a and bottom 104a frame elements. Since the first locking element 120 extends substantially the entire length of the top 102a and bottom 104a frame elements, the display elements 136a are thus capable of being selectively interchangeably displayed at any of a plurality of locations along the lengths of the top 102a and bottom 104a frame elements to change the overall decorative appearance of the decorative assembly 100a as viewed from a first vantage point.

Figure 33:
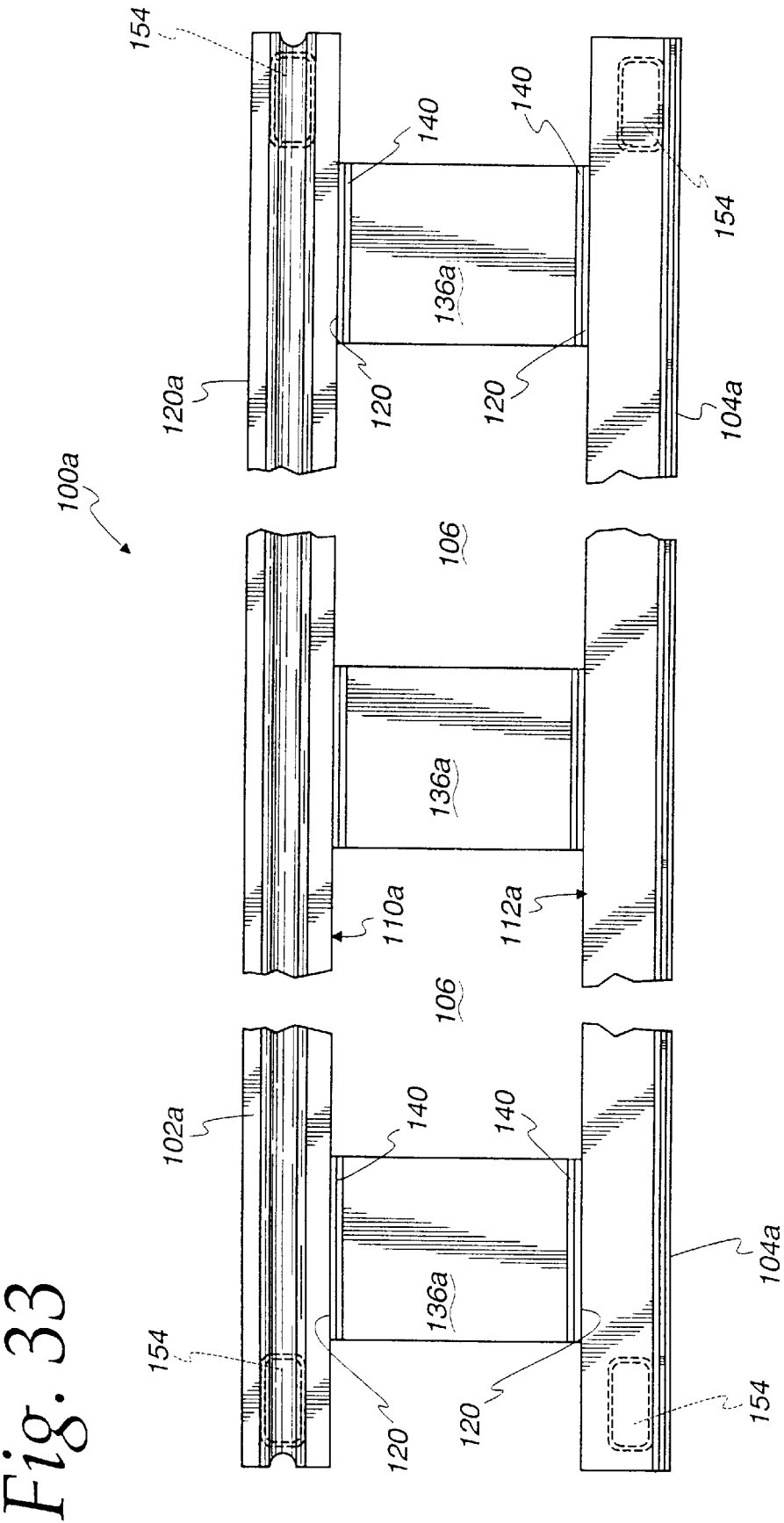
FIG. 33 is a front elevation view of a seventh embodiment of the decorative assembly of the present invention, including spaced apart frame elements and exemplary display elements.

Alternatively, as shown in FIG. 33, the first locking element 120 may be provided on the inner surfaces 110a and 112a of the top 102a and bottom 104a frame elements at selected points along the lengths thereof. In this configuration, the display elements 136a are thus capable of being selectively interchangeably displayed at any of the plurality of predetermined locations established by the positioning of the first locking element 120 on the top 102a and bottom 104a frame elements.

Figure 34:
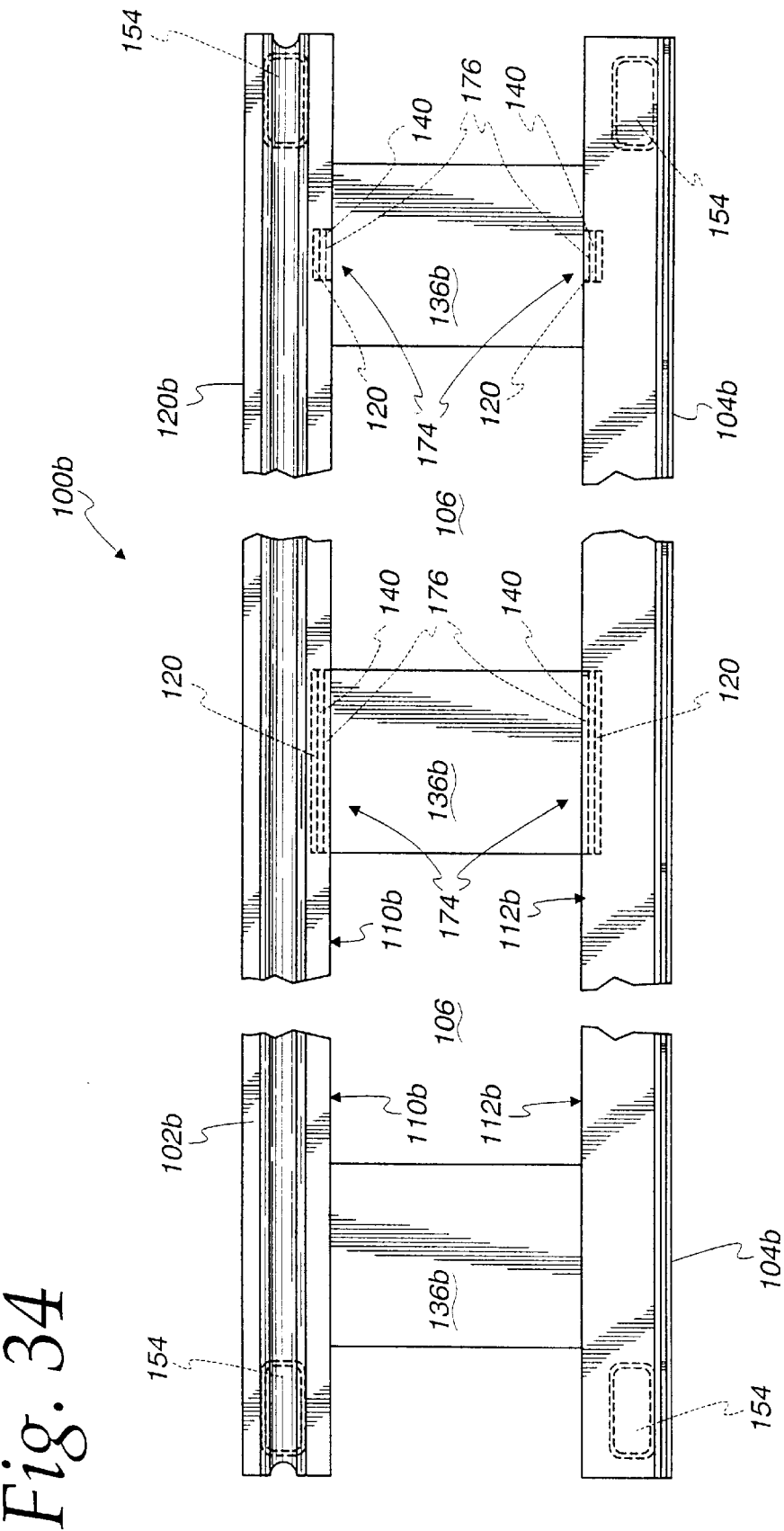
FIG. 34 is a front elevation view depicting various alternative embodiments of the decorative assembly of the present invention, including spaced apart frame elements and exemplary display elements.

Still further, as shown in FIG. 34, the top 102b and bottom 104b frame elements may include receptacles 174 formed on the inner surfaces 110b and 112b at predetermined locations along the lengths of the top 102b and bottom 104b frame elements. The first locking element 120 is disposed on the bottom surface of the receptacles 174, while the second locking element 140 is disposed on opposing projections 176 extending from the display elements 136b. The projections 176 on the display elements 136b are received within the receptacles 174 formed in the top 102b and bottom 104b frame elements. The first locking element 120 and receptacle 174 cooperate respectively with the second locking element 140 and projection 176 to selectively interchangeably display the display elements 136b at any of the plurality of predetermined locations established by the positions of the receptacles 174. As shown in the middle and right sections of FIG. 34, the lengths of the cooperating receptacle 174 and projection 176 may vary.

Also, as shown in the left section of FIG. 34, the display element 136b may be maintained in the display space 106 between the top 102b and bottom 104b frame elements without the need for any additional structure. The frictional forces between the inner surfaces 110b and 112b of the top 102b and bottom 104b frame elements against the surfaces of the display element 136b frictionally maintain the display element 136b in the display space 106 between the top 102b and bottom 104b frame elements.

It is to be understood that in the above-described embodiments which utilize first 120 and second 140 locking elements, either the top 102b or bottom 104b frame elements may be utilized independently of one another without departing from the spirit and scope of the present invention. Further, it is not necessary that both the top and bottom frame elements include structure for selectively releasably maintaining the display element in the display space 106. It is sufficient that one of the top and bottom frame elements include such structure, while the other may be provided to simply press against the display element and provide a decorative finishing touch.

When the decorative assemblies described above are mounted to a window, the above-described decorative elements produce silhouettes as the outside, or inside, light shines in through the window. The interchangeability of the decorative elements permits a home or business owner to customize their window treatments, adding personality and comfort to their home or business. The decorative elements may be changed in accordance with the holiday seasons to produce a Christmas, Easter, Thanksgiving, etc. decorative theme, or with the change of seasons, or even change or accent the decor of the room. Various themes could include southwestern, animals, nature, florals, sports, arts, music, ballet, etc.

It should be noted that the decorative assemblies described above are not intended to be limited to use on a window. The decorative assemblies can be mounted anywhere in a home or room to add aesthetically pleasing features thereto. For instance, the decorative assemblies could be used, for illustrative purposes only, as a pot rack, a wall border, or merely as a wall hanging adding aesthetically pleasing features to a room.

While the invention has been described with particular references to the drawings, it should be understood that various modifications can be made without departing from the spirit and scope of the present invention.

What is claimed is:

1. A kit comprising:
   a frame having first and second spaced apart frame elements between which a display space is defined and visible as viewed from a first vantage point;
   a first display element;
   a receptacle and projection defined one each on at least one of the first and second frame elements and the first display element cooperating to releasably maintain the first display element in a first predetermined relationship at a first location in the display space,
   the first display element in the first predetermined relationship at the first location performing primarily a decorative function and having a first decorative appearance as viewed from the first vantage point;
   a second display element; and
   a receptacle and projection defined one each on at least one of the first and second frame elements and the second display element cooperating to releasably maintain the second display element in a second predetermined relationship at the first location in the display space with the first display element absent from the first location,
   the second display element in the second predetermined relationship at the first location performing primarily a decorative function and having a second decorative appearance as viewed from the first vantage point,
   the first and second display elements capable of being selectively interchangeably displayed at the first location to selectively change the overall decorative appearance of the first and second frame elements as viewed from the first vantage point.

2. The kit of claim 1, wherein the receptacle and projection defined on at least one of the first and second frame elements and the first display element comprise a dove-tail receptacle and projection.

3. The kit of claim 1, wherein the receptacle and projection defined on at least one of the first and second frame elements and the second display element comprise a dove-tail receptacle and projection.

4. The kit of claim 1, further in combination with a window having an inner and an outer surface, wherein the first and second frame elements are releasably attached to the inner surface of the window.

5. The kit of claim 1, wherein the first and second spaced apart frame elements are elongate and have inner surfaces facing one another and between which the display space is defined, at least one of the inner surfaces having a channel defining the receptacle and extending lengthwise along the respective frame element, and wherein the first and second display elements each have at least one flange defining the projection, the at least one flange on the first and second display elements removably receivable in the at least one channel for guided sliding translatory movement of the first and second display elements in the display space relative to the first and second frame elements.

6. The kit of claim 5, wherein at least one of the first and second display elements are snap-fit to the first and second frame elements.

7. The kit of claim 5, wherein the at least one channel extending lengthwise along the respective frame element has a female dove-tail configuration, and the at least one flange on the first and second display elements has a male dove-tail configuration that is complementary to the female dove-tail configuration.

8. The kit of claim 1, wherein the first and second spaced apart frame elements are elongate and have inner surfaces facing one another and between which the display space is defined, at least one of the inner surfaces having a rib defining the projection and extending lengthwise along the respective frame element, and wherein the first and second display elements each have at least one slot defining the receptacle, the at least one rib removably receivable in the at least one slot in the first and second display elements for guided sliding translatory movement of the first and second display elements in the display space relative to the first and second frame elements.

9. The kit of claim 8, wherein at least one of the first and second display elements are snap-fit to the at least one first and second frame elements.

10. The kit of claim 8, wherein the at least one rib extending lengthwise along the respective frame element has male dove-tail configuration, and the at least one slot in the first and second display elements has a female dove-tail configuration that is complementary to the male dove-tail configuration.

11. The kit of claim 1, wherein the receptacle and projection defined one each on at least one of the first and second frame elements and the first display element include cooperating locking elements to selectively releasably maintain the first display element in the first predetermined relationship at the first location in the display space.

12. The kit of claim 1, wherein the at least one receptacle and projection defined one each on the first and second frame elements and the second display element include cooperating locking elements to selectively releasably maintain the second display element in the second predetermined relationship at the first location in the display space with the first display element absent from the first location.

13. The kit of claim 1, wherein the first decorative appearance of the first display element is different than the second decorative appearance of the second display element.

14. The kit of claim 1, wherein the first and second display elements are non-transparent.

15. A kit comprising:
    a frame having first and second spaced apart frame elements between which a display space is defined and visible as viewed from a first vantage point, each of said first and second frame elements having a length and including a plurality of receptacles/projections defined therein at predetermined locations along each length;
    a first display element;
    a pair of projections/receptacles defined on the first display element selectively cooperating with the receptacles/projections in the first and second frame elements to selectively releasably maintain the first display element in the display space at any of the predetermined locations,
    the first display element at any of the predetermined locations performing primarily a decorative function and having a first decorative appearance as viewed from the first vantage point;

a second display element; and a pair of projections/receptacles defined on the second display element selectively cooperating with the receptacles/projections in the first and second frame elements to selectively releasably maintain the second display element in the display space at any of the predetermined locations, the second display element at any of the predetermined locations performing primarily a decorative function and having a second decorative appearance as viewed from the first vantage point, the first and second display elements capable of being selectively interchangeably displayed at any of the predetermined locations to change the overall decorative appearance of the first and second frame elements as viewed from the first vantage point.

16. The kit of claim 15, further in combination with a window having an inner and an outer surface, wherein the first and second frame elements are releasably attached to the inner surface of the window.

17. The kit of claim 15, wherein the cooperating projections and receptacles on the first and second display elements and the first and second frame elements comprise cooperating dove-tail connections.

18. The kit of claim 17, wherein at least one of the first and second display elements are press-fit to the first and second frame elements.

19. The kit of claim 15, wherein the first decorative appearance of the first display element is different than the second decorative appearance of the second display element.

20. The kit of claim 15, wherein the first and second display elements are non-transparent.

21. The kit of claim 15, wherein the cooperating projections and receptacles on the first and second display elements and the first and second frame elements include cooperating locking elements to selectively releasably maintain the first and second display elements in the display space at any of the predetermined locations.

22. In combination:

an enclosed frame defining a display space therebetween and visible as viewed from a first vantage point, the enclosed frame including first and second spaced apart frame elements;

a first display element separate from the enclosed frame;

a receptacle and projection defined one each on the first display element and at least one of the first and second frame elements cooperating to releasably maintain the first display element in a first predetermined relationship at a first location in the display space, the first display element in the first predetermined relationship at the first location performing primarily a decorative function and having a first decorative appearance as viewed from the first vantage point;

a second display element separate from the enclosed frame; and a receptacle and projection defined one each on the second display element and at least one of the first and second frame elements cooperating to releasably maintain the second display element in a second predetermined relationship at the first location in the display space with the first display element absent from the first location, the second display element in the second predetermined relationship at the first location performing primarily a decorative function and having a second decorative appearance as viewed from the first vantage point, the first and second display elements capable of being selectively interchangeably displayed at the first location to selectively change the overall decorative appearance of the enclosed frame as viewed from the first vantage point.

23. The combination of claim 22, wherein the receptacles and projections on the first and second display elements and the at least one of the first and second frame elements include cooperating locking elements to selectively releasably maintain the first and second display elements in the display space.

24. A kit comprising:

a frame having first and second spaced apart frame elements between which a display space is defined and visible as viewed from a first vantage point, the first and second frame elements being elongate and having inner surfaces facing one another and defining the display space, at least one of the inner surfaces of the first and second frame elements including a first locking element;

a first display element including a second locking element cooperating with the first locking element to selectively releasably maintain the first display element in a first predetermined relationship at a first location in the display space, the first display element in the first predetermined relationship at the first location performing primarily a decorative function and having a first decorative appearance as viewed from the first vantage point; and a second display element including a third locking element cooperating with the first locking element to selectively releasably maintain the second display element in a second predetermined relationship at the first location in the display space with the first display element absent from the first location, the second display element in the second predetermined relationship at the first location performing primarily a decorative function and having a second decorative appearance as viewed from the first vantage point.

25. The kit of claim 24, wherein the first locking element extends along the length of the at least one inner surface of the respective frame element, the first and second locking elements, and the first and third locking elements, cooperating to selectively releasably maintain the first and second display elements, respectively, in the display space at any of a plurality of locations along the length of the first and second frame elements.

26. The kit of claim 24, wherein the at least one inner surface of the respective frame element includes at least one receptacle formed therein, the first locking element being disposed in the at least one receptacle, the first and second display elements each having at least one projection including the second and third locking elements, respectively, the at least one projection and second and third locking elements on the first and second display elements, respectively, interchangeably cooperating with the receptacle and first locking element on the at least one of the first and second frame elements to selectively releasably maintain the first and second display elements in the display space.

27. The kit of claim 24, wherein the at least one inner surface includes a channel formed therein and extending lengthwise along the respective frame element, the channel having the first locking element provided therein and extending along the length of the channel, the first and second display elements each having at least one projection including the second and third locking elements, respectively, the at least one projection and second and third locking elements on the first and second display elements, respectively, cooperating with the channel and first locking element in the at least one inner surface of the first and second frame elements to selectively releasably maintain the first and second display elements in the display space at any of a plurality of locations along the length of the first and second frame elements.

28. The kit of claim 27, wherein the channel formed in the at least one inner surface of the first and second frame elements includes opposing retaining surfaces and a bottom surface therebetween defining the at least one receptacle for receiving the projections on the first and second display elements, wherein the first locking element is located on the bottom surface of the channel.

29. The kit of claim 27, wherein the channel formed in the at least one inner surface of the first and second frame elements includes a retaining surface and a bottom surface defining the at least one receptacle for receiving the projections on the first and second display elements, wherein the first locking element is located on the bottom surface of the channel.

30. The kit of claim 24, wherein the first, second and third locking elements each include a plurality of mushroom-shaped members each having a shaft and an enlarged head, the enlarged heads on the first, second and third locking elements cooperating to selectively releasably maintain the first and second display elements in the display space.

31. The kit of claim 24, further in combination with the window having an inner and an outer surface, wherein the first and second frame elements are releasably attached to the inner surface of the window.

32. The kit of claim 24, wherein the first decorative appearance of the first display element is different than the second decorative appearance of the second display element.

33. A kit comprising:
a frame having first and second spaced apart frame elements between which a display space is defined and visible as viewed from a first vantage point, the first and second frame elements being elongate and having inner surfaces facing one another and defining the display space, each inner surface having a channel formed therein and extending lengthwise along the respective frame element, each of the channels having a first locking element disposed therein and extending along the length of the respective channel;
a first display element;
a pair of projections defined on the first display element, each of the pair of projections including a second locking element,
the projections and second locking elements on the first display element cooperating with the channels and first locking elements in the first and second frame elements to selectively releasably maintain the first display element in the display space at any of a plurality of locations along the length of the first and second frame elements,
the first display element at any of the plurality of locations along the length of the first and second frame elements performing primarily a decorative function and having a first decorative appearance as viewed from the first vantage point;
a second display element; and
a pair of projections defined on the second display element, each of the pair of projections including a third locking element,
the projections and third locking elements on the second display element cooperating with the channels and first locking elements in the first and second frame elements to selectively releasably maintain the second display element in the display space at any of the plurality of locations along the length of the first and second frame elements,
the second display element at any of the plurality of locations along the length of the first and second frame elements performing primarily a decorative function and having a second decorative appearance as viewed from the first vantage point,
the first and second display elements capable of being selectively interchangeably displayed at any of the plurality of locations along the length of the first and second frame elements to change the overall decorative appearance of the first and second frame elements as viewed from the first vantage point.

34. The kit of claim 33, further in combination with a window having an inner and an outer surface, wherein the first and second frame elements are releasably attached to the inner surface of the window.

35. The kit of claim 33, wherein the first decorative appearance of the first display element is different than the second decorative appearance of the second display element.

36. The kit of claim 33, wherein the first and second display elements are non-transparent.

37. The kit of claim 33, wherein each of the channels formed in the first and second frame elements includes opposing retaining surfaces and a bottom surface therebetween defining a receptacle for receiving the projections on the first and second display elements, wherein the first locking element is disposed on the bottom surface of each of the channels.

38. The kit of claim 33, wherein each of the channels formed in the first and second frame elements includes a retaining surface and a bottom surface defining a receptacle for receiving the projections on the first and second display elements, wherein the first locking element is disposed on the bottom surface of each of the channels.

39. The kit of claim 33, wherein the first, second and third locking elements each include a plurality of mushroom-shaped members each having a shaft and an enlarged head, the enlarged heads on the first, second and third locking elements cooperating to releasably maintain the first and second display elements in the display space at any of the plurality of locations along the length of the first and second frame elements.

40. A kit comprising:
an elongate frame element performing primarily a decorative function and having a decorative appearance as viewed from a first vantage point, the elongate frame element including a first locking element disposed thereon;
a first display element including a second locking element cooperating with the first locking element on the elongate frame element to selectively releasably maintain the first display element in a first predetermined relationship at a first location on the elongate frame element,
the first display element in the first predetermined relationship at the first location performing primarily a decorative function and having a first decorative appearance as viewed from the first vantage point; and
a second display element including a third locking element cooperating with the first locking element on the elongate frame element to selectively releasably maintain the second display element in a second predetermined relationship at the first location on the elongate frame element with the first display element absent from the first location, the second display element in the second predetermined relationship at the first location performing primarily a decorative function and having a second decorative appearance as viewed from the first vantage point.

41. The kit of claim 40, wherein the first locking element extends along the length of the elongate frame element, the first and second locking elements, and first and third locking elements, cooperating to selectively releasably maintain the first and second display elements, respectively, on the elongate frame element at any of a plurality of locations along the length of the elongate frame element.

42. The kit of claim 40, wherein the elongate frame element includes a channel formed therein and extending lengthwise along the elongate frame element, the channel having the first locking element provided therein and extending along the length of the channel, the first and second display elements each having a projection including the second and third locking elements, respectively, the projection and second and third locking elements on the first and second display elements, respectively, cooperating with the channel and first locking element in the elongate frame element to selectively releasably maintain the first and second display elements on the elongate frame element at any of a plurality of locations along the length of the elongate frame element.

* * * * *